UNITED STATES PATENT OFFICE.

REES B. SMITH, OF MOUNT PLEASANT, OHIO.

IMPROVED COMPOSTION FOR FACING MOLDS.

Specification forming part of Letters Patent No. 56,817, dated July 31, 1866.

*To all whom it may concern:*

Be it known that I, REES B. SMITH, of Mount Pleasant, in the county of Jefferson and State of Ohio, have made new and useful Improvements in Compositions for Stove-Facing; and I do hereby declare the following to be a full, clear, and exact description of the nature and mode of compounding the same, sufficient to enable one skilled in the art to which it is allied to use the same.

My improved compound consists, mainly, of a red clayey mineral found in abundance in Jefferson county, Ohio, and in some adjoining counties, and known locally as "Smith's mineral." This is powdered and mixed with from five to fifteen per cent. each of coke and charcoal dust, which forms a powder to line the inside of the mold in contact with the sand, and which secures a more perfect and beautiful face to the casting than can otherwise be procured in so economical and simple a manner.

The mineral substance above spoken of consists of—

| | Per cent. |
|---|---|
| Silica | 37.35 |
| Peroxide of iron | 7.50 |
| Alumina | 12.70 |
| Lime | 4.98 |
| Magnesia | 10.31 |
| Carbonic acid | 15.25 |
| Water | 12.00 |
| | 100.09 | from which it may be safely assumed that the substance consists of—

| | |
|---|---|
| Hydrous silicates of iron and alumina | 69.55 |
| Carbonate of lime | 8.98 |
| Carbonate of magnesia | 21.65 |
| | 100.18 | which shows a somewhat unusual predominance of magnesia over lime.

The carbonic acid and water are soon expelled by heat; and the balance of the mineral consists of nearly equal parts of silicic acid and the fluxing bases oxide of iron, alumina, lime, and magnesia. It is these bases and their large proportions which principally determine the fluxing property of the mineral.

The coke and charcoal powder are necessary ingredients in the composition, and the result is a very effective and economical compound for the purpose designed.

The mineral, which forms the major part of the composition, is of a bluish-brown color when exposed to the atmosphere, is fusible, insoluble in water, and of about the specific gravity of common iron ore.

What I claim as new, and desire to secure by Letters Patent, is—

The composition above described as a facing-powder for use in the process of casting.

The above specification of my improved composition for stove-facing signed this 14th day of May, 1866.

R. B. SMITH.

Witnesses:
ALEXR. A. C. KLAUCKE,
EDWARD H. KNIGHT.